US008025460B2

(12) United States Patent
Cobb

(10) Patent No.: US 8,025,460 B2
(45) Date of Patent: Sep. 27, 2011

(54) OCEAN OIL SPILL AND CONTAMINATED SEA ICE CONTAINMENT, SEPARATION AND REMOVAL SYSTEM

(76) Inventor: James M. Cobb, Homer, AK (US)

( * ) Notice: Subject to any disclaimer, the term of this patent is extended or adjusted under 35 U.S.C. 154(b) by 95 days.

(21) Appl. No.: 12/486,705

(22) Filed: Jun. 17, 2009

(65) Prior Publication Data

US 2010/0143038 A1    Jun. 10, 2010

Related U.S. Application Data

(60) Provisional application No. 61/142,712, filed on Jan. 6, 2009, provisional application No. 61/120,936, filed on Dec. 9, 2008.

(51) Int. Cl.
*E02B 15/02* (2006.01)
*E02B 15/06* (2006.01)

(52) U.S. Cl. .................. 405/61; 405/63; 405/66
(58) Field of Classification Search .......... 405/60, 405/61, 63, 64, 65, 66
See application file for complete search history.

(56) References Cited

U.S. PATENT DOCUMENTS

| | | | | |
|---|---|---|---|---|
| 3,631,679 A | * | 1/1972 | Fisch | 405/68 |
| 3,839,870 A | * | 10/1974 | Ryan | 405/64 |
| 4,889,447 A | | 12/1989 | Strange | |
| 4,935,152 A | * | 6/1990 | Gonzales | 405/64 |
| 5,045,216 A | | 9/1991 | Eller | |
| 5,066,164 A | | 11/1991 | Tomosy | |
| 5,071,286 A | * | 12/1991 | Separovich | 405/66 |
| 5,114,272 A | * | 5/1992 | Brunhoff et al. | 405/66 |
| 5,215,407 A | * | 6/1993 | Brelsford | 405/63 |
| 5,215,654 A | | 6/1993 | Karterman | |
| 5,269,627 A | | 12/1993 | Neal | |
| 5,328,607 A | | 7/1994 | Soule | |
| 5,372,455 A | | 12/1994 | Tarca | |
| 5,470,467 A | | 11/1995 | Soule | |
| 5,792,350 A | | 8/1998 | Sorley et al. | |
| 5,885,451 A | | 3/1999 | Porrovecchio, Sr. | |
| 6,073,382 A | * | 6/2000 | Willener | 405/60 |
| 6,663,772 B2 | | 12/2003 | Rosquist | |
| 7,326,354 B2 | * | 2/2008 | Ferreira | 405/63 |
| 2007/0217867 A1 | * | 9/2007 | Son | 405/63 |

OTHER PUBLICATIONS

International Search Report from corresponding PCT application PCT/US2009/065526, dated Feb. 18, 2010.
Written Opinion of the International Searching Authority from corresponding PCT application PCT/US2009/065526, dated Feb. 18, 2010.

* cited by examiner

*Primary Examiner* — Frederick L Lagman
(74) *Attorney, Agent, or Firm* — Sandra Poteat Thompson; Buchalter Nemer

(57) ABSTRACT

A method for containing and cleaning up oil or other contaminants from an area of water containing mixture of ice and water is disclosed. A net having at least one folded extension is deployed into an area of water and ice to encircle at least a portion of the contaminant spill. The ends of the net are attached to each other in contaminant resistant way to contain the contaminant in the net. The folded extension is deployed to an unfolded configuration. The net is the then pursed up using the extension to control the contaminant in the net. The contaminant is pumped out of the net as needed to allow the net to continue to be pursed up to a smaller and smaller area.

17 Claims, 17 Drawing Sheets

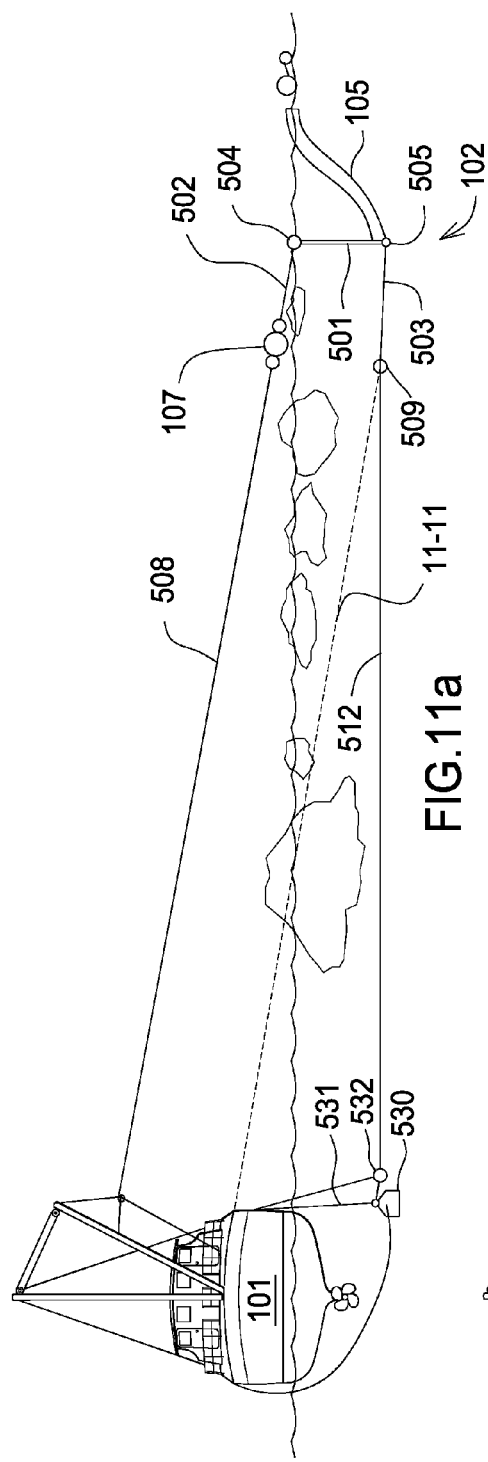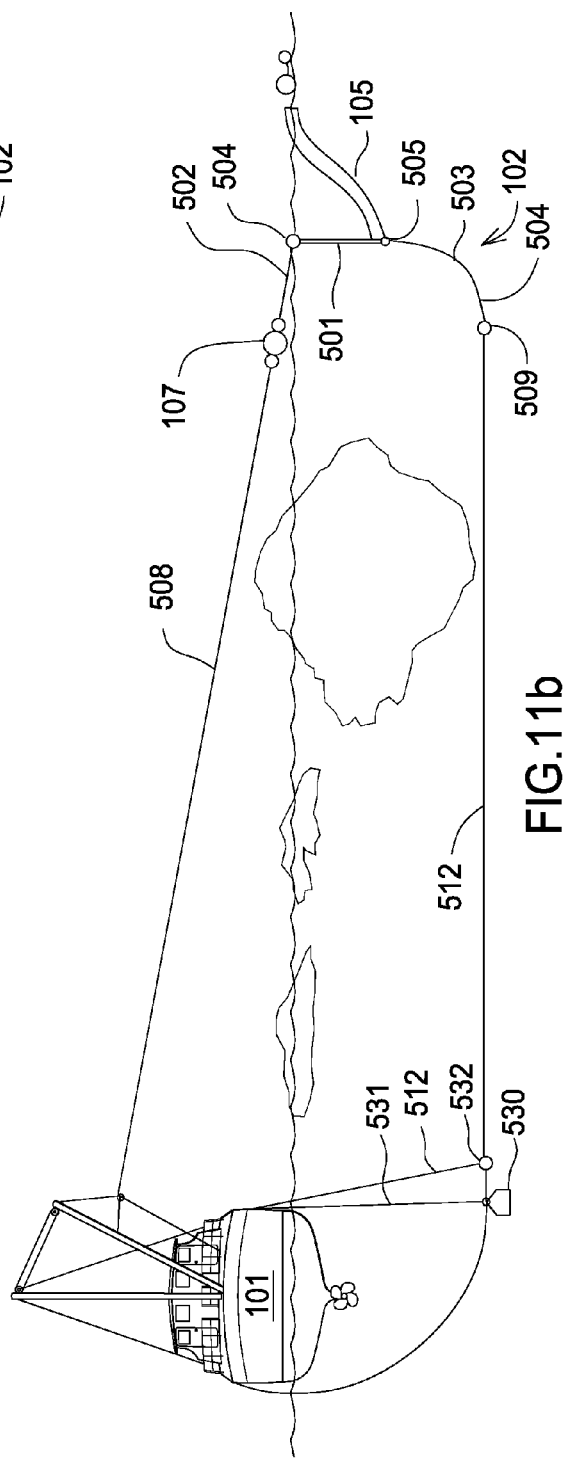

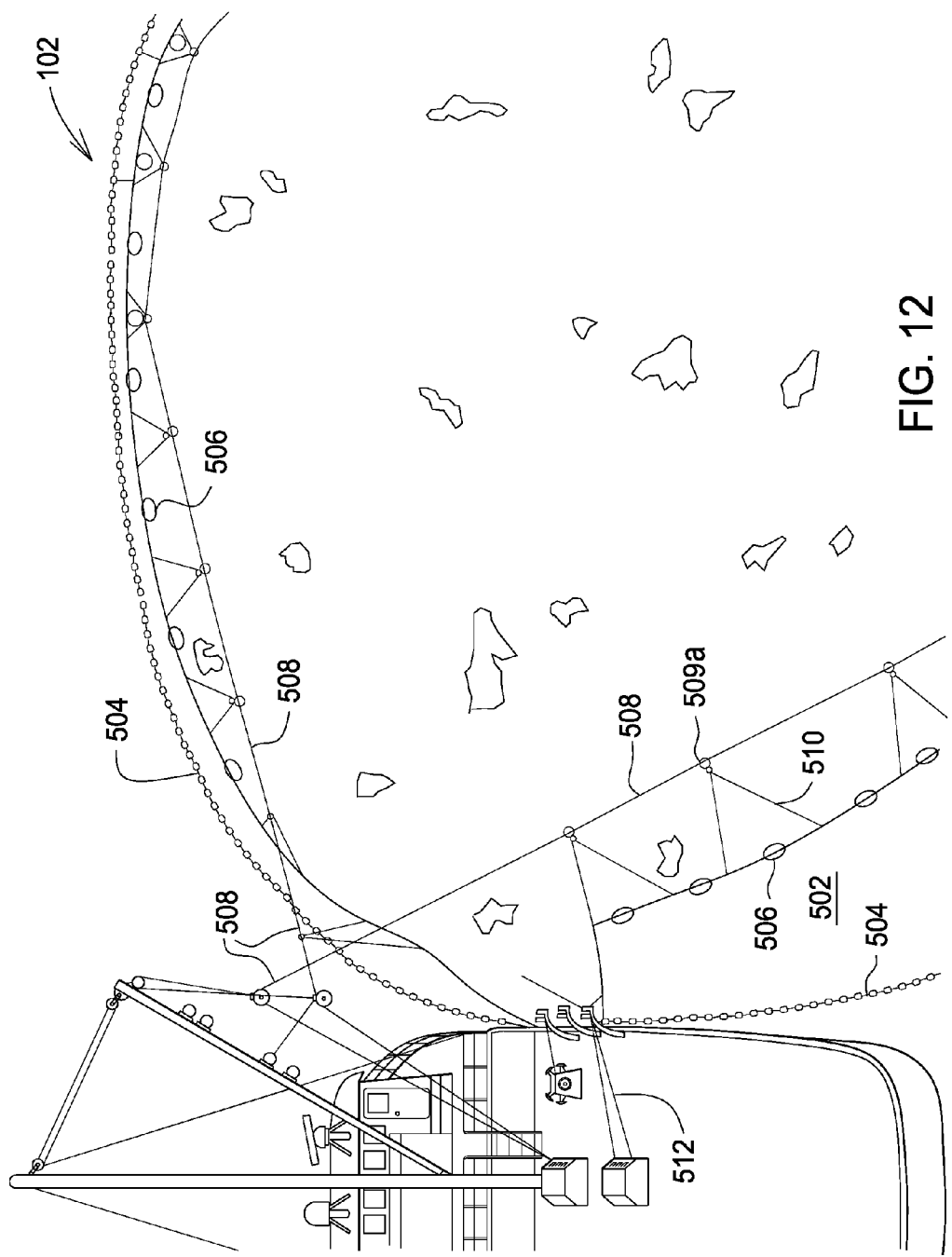

BRAIL AREA

ОСЕАN OIL SPILL AND CONTAMINATED
SEA ICE CONTAINMENT, SEPARATION AND
REMOVAL SYSTEM

BACKGROUND

The environmental damage from oil and gas spills in navigable waters is well known. As explorations have expanded into the polar regions, more and more oil and gas spills are happening in waters with large amounts of floating ice. This floating ice makes current oil spill containment methods very difficult. Even if oil on the water surface is contained, there is no easy way to deal with all of the oil contaminated ice pieces. The lack of a way to deal with contaminated ice has hampered oil and gas production in many polar areas, as the drilling sites are near many critical habitats.

The foregoing example of the related art and limitations related therewith are intended to be illustrative and not exclusive. Other limitations of the related art will become apparent to those of skill in the art upon a reading of the specification and a study of the drawings.

SUMMARY

It is an aspect of the present invention to provide a method to clean oil and gas spills in waters with a mixture of water and ice.

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

A method of containing oil spills in mixed ice and water environments is disclosed. The mixture is contained in a net, the liquids separated, the oil pumped out and then the ice oil mixture is pulled on board a barge for cleaning.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

FIGS. 11A and 11B are side views of the system used to pull the lead line purse line horizontal.

FIG. 12 a perspective view of the boat and net with the purse lines being drawn in.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1A:
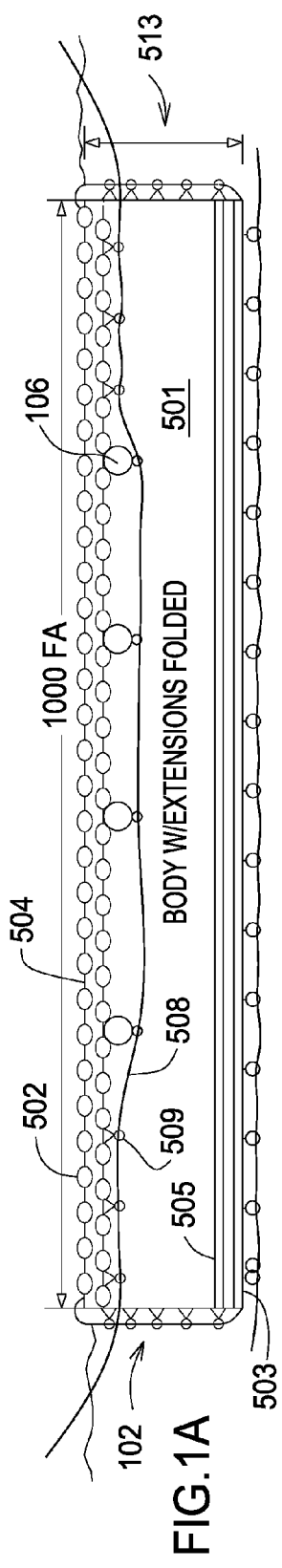
FIGS. 1A and 1B are plan views of the net for containing the oil spill.
Figure 1B:
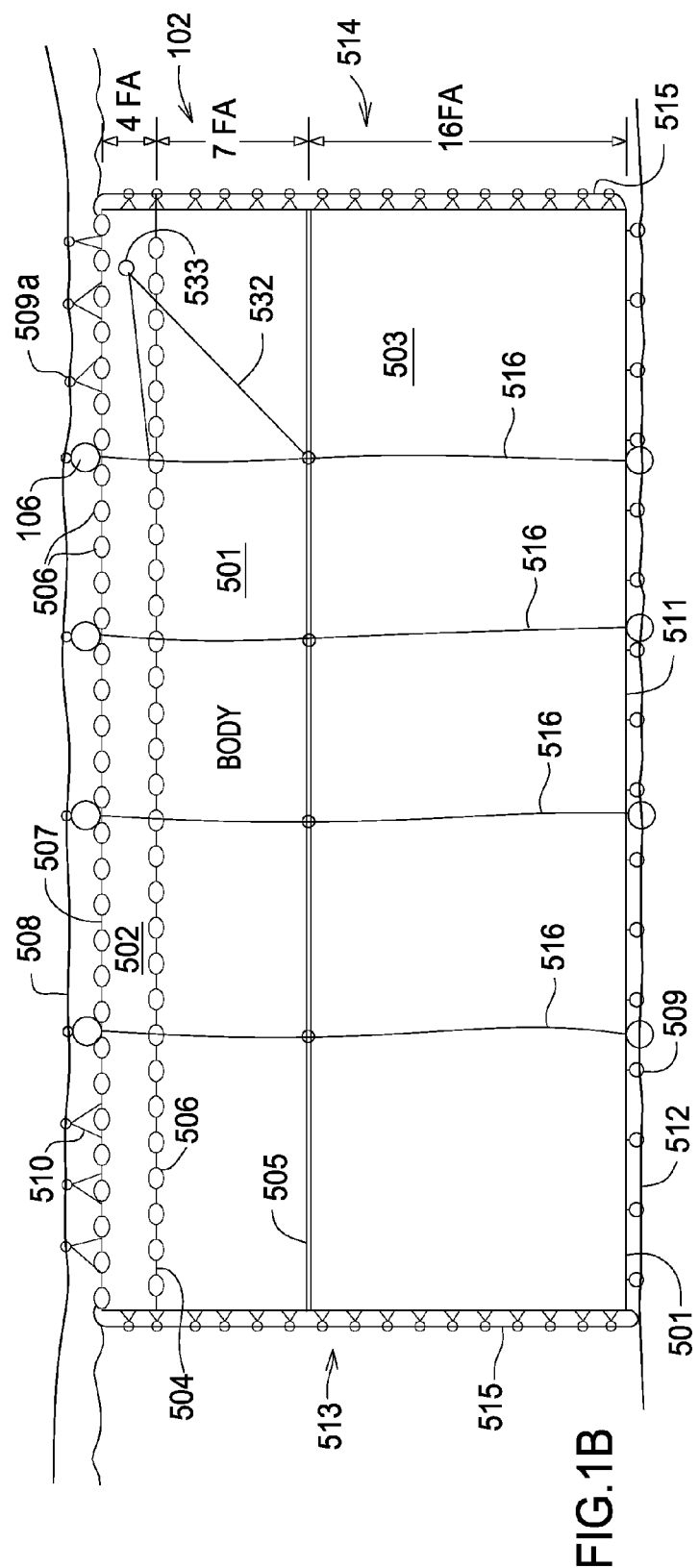

The disclosure of the method and the equipment for the using the method are discussed in terms of containing an oil spill. It is to be understood that the method is not limited to cleaning up oil spills. Any liquid contaminant that has some separation from water and floats on water could be contained and cleaned up using the disclosed method. No limitation of the use of the method to oil should be inferred. Referring first to FIG. 1A, the net 102 is viewed from the inside, floating horizontally in the water in one deploying configuration. The net has three main sections, the body 501, the cork line extension 502 and the lead line extension 503. In FIG. 1A the cork line extension 502 and lead line extension 503 are each folded and tied to the body 501 with breakable ties. In some deploying configurations, the cork line extension 502 may not need to be folded in to deploy the net 102 and only the lead line extension 503 will need to be folded and tied. This will depending on the conditions the net 102 is being deployed in. The depth of the net 102 in the deploying configuration is the deployed depth. In shallow water, folding the lead line extensions 503 can help reduce the odds of catching the net 102 on the bottom. The net 102 will be laid into the water in one of the deploying configurations as discussed below. The body 501 has a first cork line 504 with corks (floats) 506 and a first lead line 505. The lead lines can be standard fishing lead lines. Lead lines can be ordered from manufactures in a wide variety of weights per unit length. The selection of the appropriate weight lead line is well known in the art and will not be further discussed. The cork line extension 502 has a second cork line 507 with corks 506. A cork line purse line 508 runs through rings 509. As seen in FIG. 1B, where needed, ring lines 510 extend the distance that the purse line 508 can be from the second cork line 507. At various locations the on the net 102 the net has towing bridles 532 attached to the first cork line 504 and first lead line 505 which feeds through ring 533 in net 102.

Additional floatation can be provided by buoys 106. When needed, the buoys can have custom designed fittings with rings and eyes made for the specific usage. The buoys 106 can be made of radar reflective material and/or have a radar reflective portion so the shape of the net 102 in the water can be monitored, even in conditions of low or no visibility. The buoys 106 can also have lights and/or reflective strips for improved visibility of the net 102 in low visibility conditions. If lights are used, a color of light that is not used for navigational lights may be desired, so that the lights on the net 102 are less likely to cause confusion for other vessels in the area. In another embodiment, different color lights and/or reflectors could be used on the different sections of the rigging and/or net to allow the crew to know where the different elements, discussed below, are currently in the water.

In FIG. 1B, the net 102 is viewed from the outside, floating horizontally in the water in the fully extended configuration. The lead line extension 503 has second lead line 511 with ring lines 510 and ring 509 for lead line extension purse line 512. One end of the net 102 is the wing 513 and the other is the bunt 514 as in standard seining nets. Each end has a breast line 515 run through rings 509. Body lines 516 run from buoys 106 and connect to the first and second cork line 504, 507 the first and second lead lines 505, 511 and the purse rings 509 to add shape and strength to the net 102 when in use.

In the depicted embodiment the net 102 is made from Spectra® webbing with Kevlar sheeting. Tyveck®, or other nonwoven polyolefin fabric sheeting can be used for added waterproofing. If needed multiple layers of either Kevlar or Tyveck in a variety of layering options can be used as needed. All lines are made from Spectra® and all sewing is done with Spectra® thread or other gel-spun polyethylene synthetic fiber in the depicted embodiment. Other materials could be used so long as they met the requirements of strength, oil and water penetration resistance and relatively low weight. In the depicted embodiment the net 102 has an overall length of 1,000 fathoms. The cork line extension 502 has a depth of 4 fathoms, the body 501 is 7 fathoms and the lead line extension 503 is 16 fathoms.

Figure 2A:
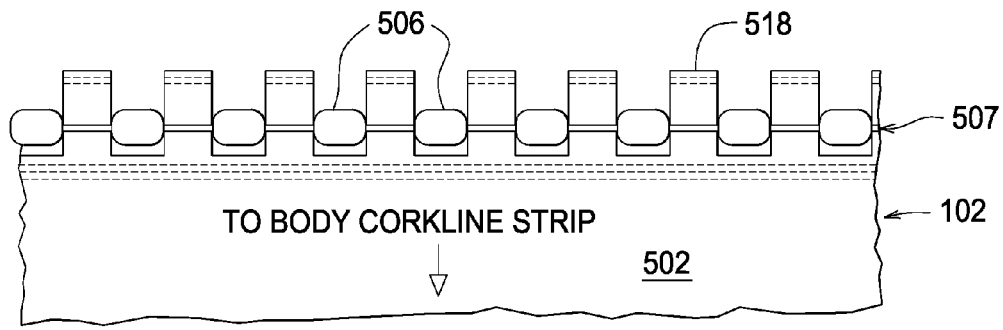
FIGS. 2A and B are as top plan view of the construction of the net.
Figure 2B:
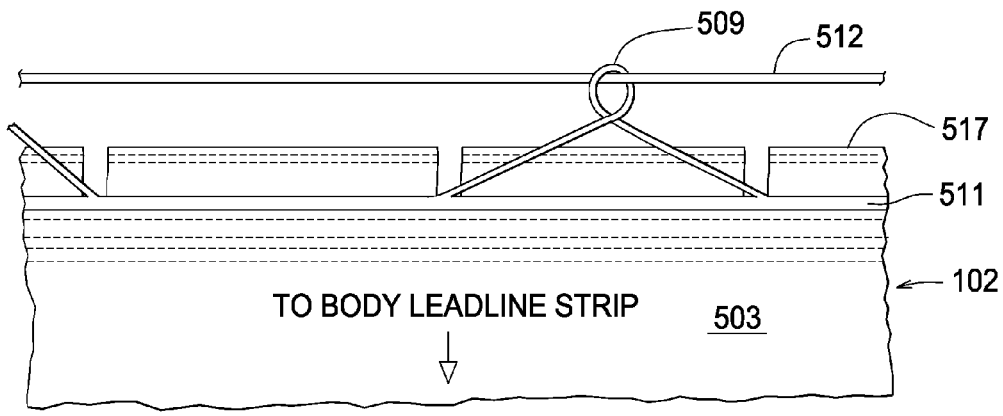
Figure 3A:
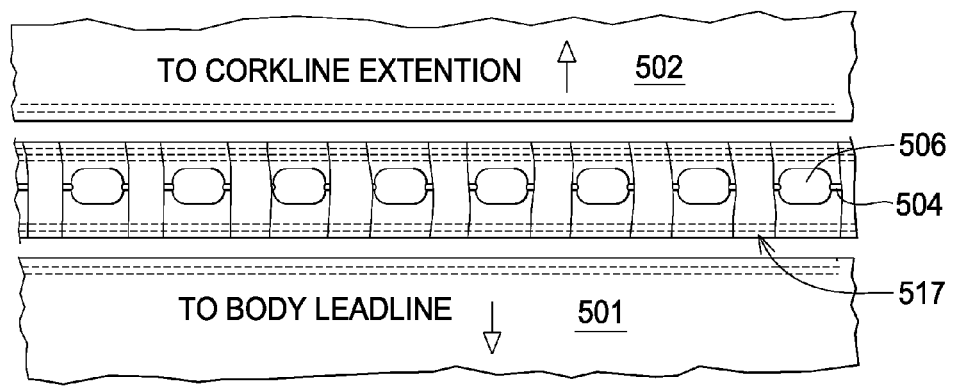
FIGS. 3A and B are a schematic view of the assembly of the net.
Figure 3B:
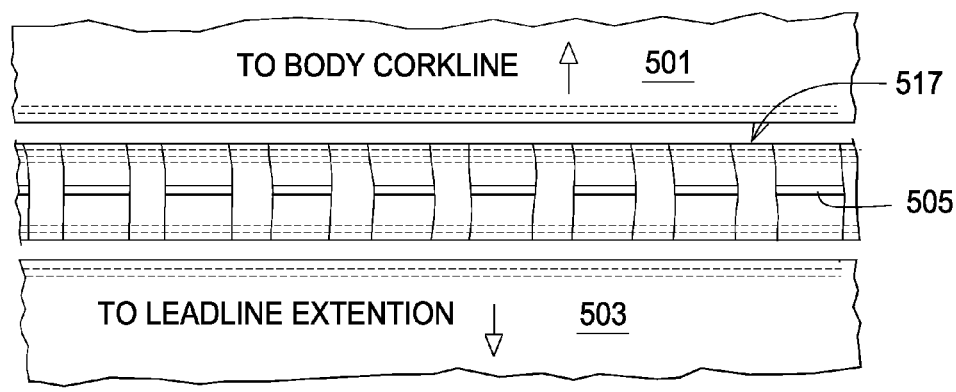

A method of mounting of the second cork line 507 and second lead line 511 on the net 102 is shown in FIG. 2, which is shown for illustration and not limitation. Flaps 518 and 517 are cut into the body and then folded and sewn to attach the lines 507 and 511 to the cork line extension 502. Other methods of attaching the lines would work as well and the disclosure is not limited to a single method of attaching the various lines to the net. The body 503 can have flaps 517 to attach the rings 509 into place to allow the purse lines 508 and 512 to draw in the net 102 in a known manner. The purse lines must be able to be drawn up, pursing the net, but so long as that function is maintained the method of mounting the ring 509 is not critical to the operation of the net 102. A similar arrangement is shown for first cork line 504 with corks (floats) 506 and a first lead line 505 in FIG. 3.

Figure 4:
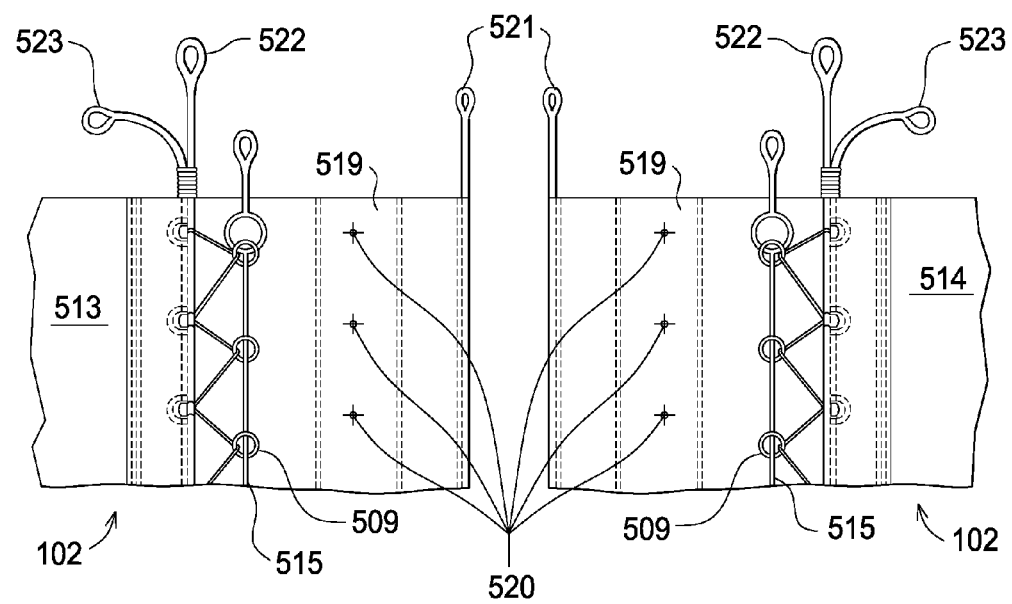
FIG. 4 is a plan view of the ends of the net.
Figure 5:
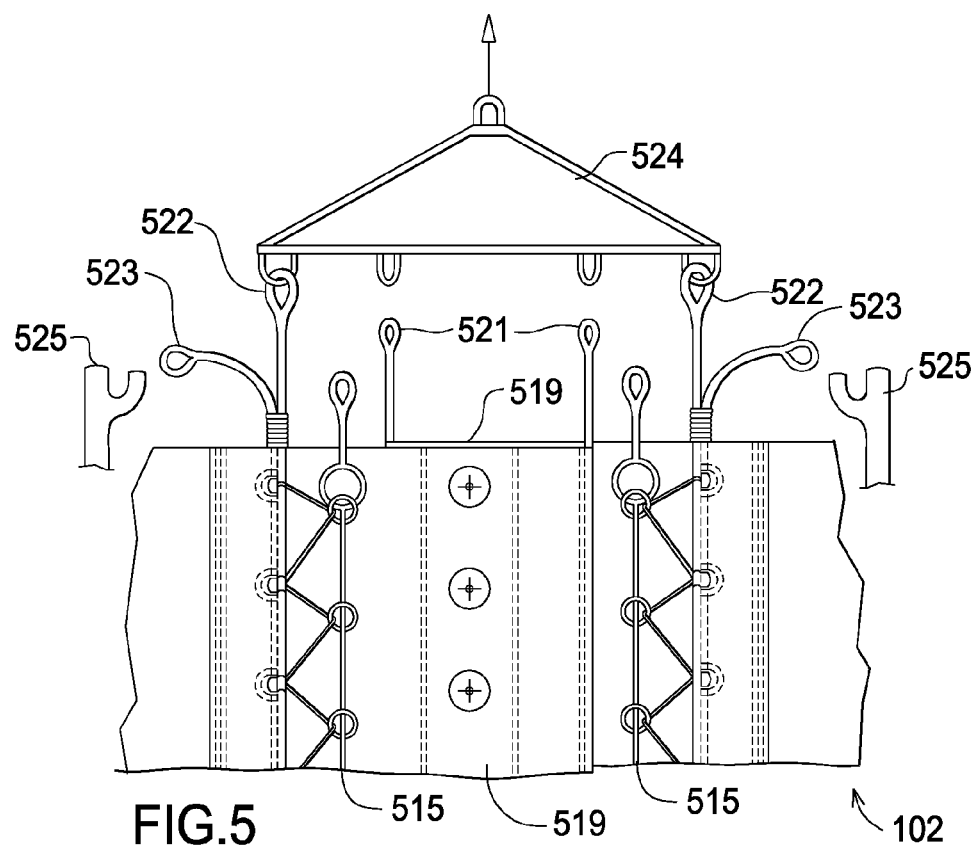
FIG. 5 is side plan view of the ends of the net being closed together.

When the net has been set as discussed below, the wing end 513 and bunt end 514 of the net are brought together to close the net 102 in a closed circle. Each end of the net can have closing flaps 519, as seen in FIG. 4. The closing flap 519 has holes 520 and eye splices 521, 522 and 523. When the ends 513, 514 are brought together and hung on davits 525 on the ship 101, the crew can overlap the closing flaps as shown in FIG. 5. Eye splices 523 can be hung on davits 525 welded to the deck of the boat to take some or all of the weight of the net 102, as in standard seine fishing. The eye splices 521 and 522 are attached to a hanger bar 524 via any chosen means. Any suitable hooking or securing means, such as, for example, shackles, snap hooks, open hooks, fabric loops, or manually tied pieces of line, may used.

Figure 6:
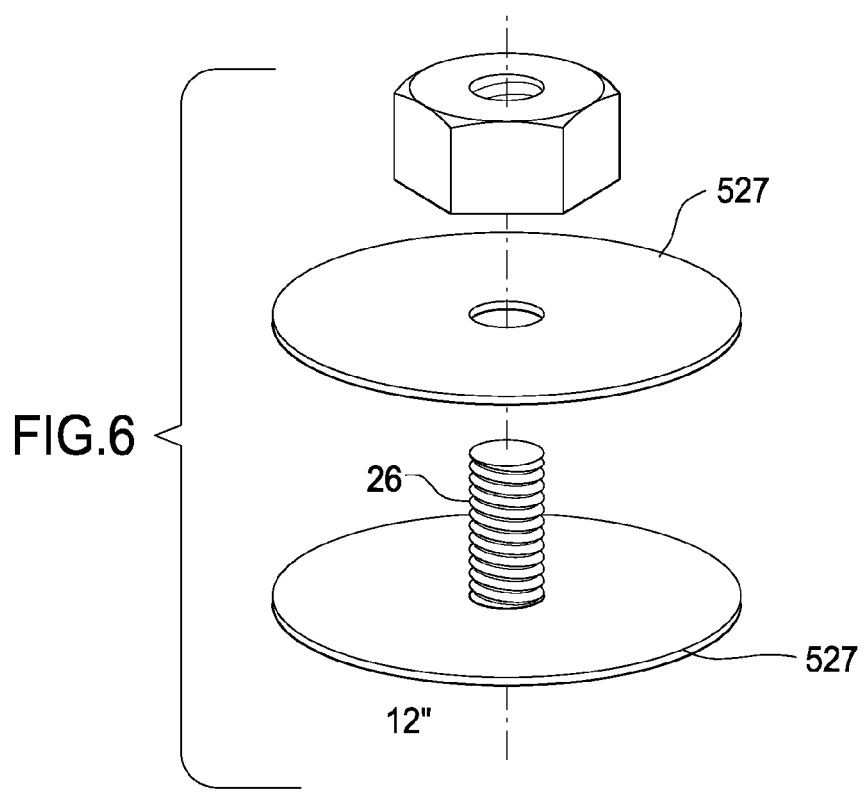
FIG. 6 is an exploded view of the sealing washers.
Figure 7D:
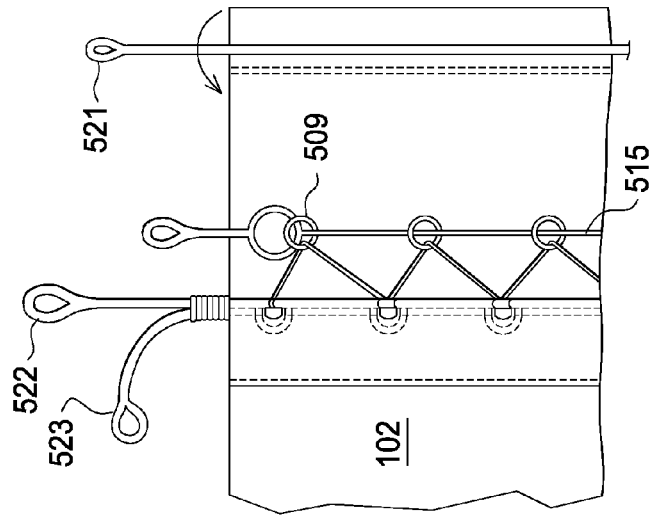
FIGS. 7a-7d are schematic views of the assembly of the ends of the net.
Figure 7C:
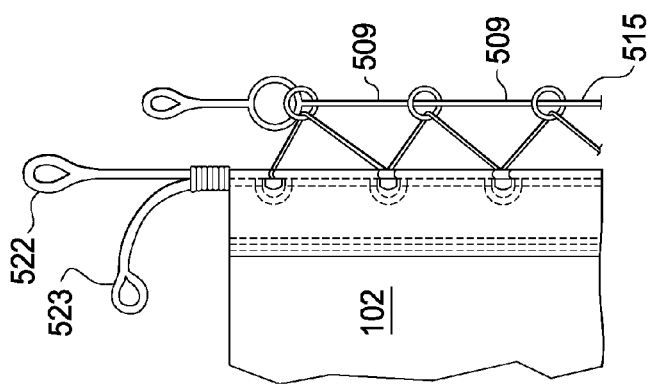
Figure 7B:
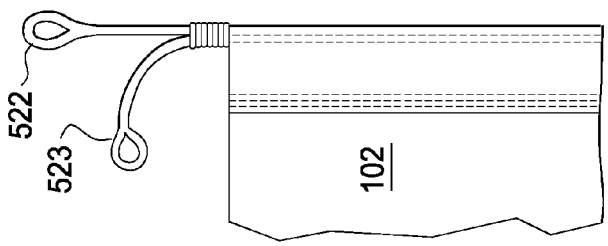
Figure 7A:
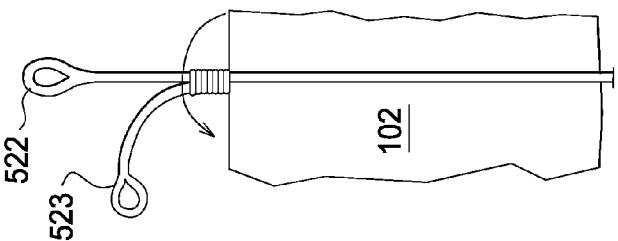

The hanger bar 524 is then attached to a boom and winch (not shown) on the catcher vessel which then pulls the ends up so that the crew can use bolts 526 and gaskets 527 shown in FIG. 6, to attach the two closing flaps 519 together. As the net 102 is pulled up by the hanger bar 524, the eye splices 523 are pulled up and off the davits 525. Other means of attaching the two closing flaps 519 together and/or securing the two ends of the net to form a closed circle could be used as well. The closing flaps 519 extend only part way down the body of the net 102 in the depicted embodiment. In the depicted embodiment the flaps are 30 feet long. The length of the closing flaps will depend on the expected water conditions, the amount of oil spilled and/or the ratio of ice to water in the area to be cleaned. The closing flaps 519 prevent oil from leaking out of the net 102 once the net 102 is set, but before the net 102 can be pursed up as discussed below. Other means of sealing the net 102 to limit the oil escaping the net 102 during pursing could be used as well. The disclosed system is not limited to a particular method of closing the net 102. Once the closing flaps 519 are closed, the net 102 would be hung back on the davits 525 so that pursing can begin as in standard seine fishing.

The assembly of the ends and closing flaps is shown in FIGS. 7a-7d. The eye splices 522 and 523 are attached as in standard seine nets. In the alternative, the eyes could be made of line as well. The eye splices 523, 522 are attached to the end of the net 102 by being sewn into to the end of the net. The breast line 515 is threaded through ring 509 which are also attached to the net 102. The closing flaps 519 can then be sewn onto the end of the net 102 with a eye splice 521 attached. Other methods of assembling the net and closing flaps could be used as well. The disclosure is not limited to a single assembly method of the net.

Only in very small spills will the entire oil spill be able to be encircled with a single set of the net 102. If the spill is very large, it may be desirable to have buoys with GPS monitors and radio transmitters deployed around the spill to allow the size, speed, direction of flow etc, etc to be monitored. The buoys can be designed so that some of them will follow with ice floes (ie driven by wind direction and speed) and others can be designed to be carried with the current. Additionally, GPS trackers could be put directly on larger icebergs to track each of them individually. The design of floating objects to move either with wind direction or current direction is well known in the art and will not be further discussed. The exact design and configuration of these buoys will depend on the exact type of spill, ocean conditions and weather conditions. In a large spill, hundreds of GPS buoys could be used to help track the spill, ice flows and water currents and allow the cleanup crews, local population, and government officials to plan accordingly. If desired, the buoys could have detectors to sense if the buoy is floating in oil, so that the cleanup crew would know if a buoy has floated out of the spill area. These monitoring buoys can allow the cleanup crew to decide where to set the net 102 next, taking into consideration critical habitat, current speed and direction, weather and any other factors that may affect the choice of what parts of the spill need to be cleaned up next.

If desired, all of the vessels involved, critical parts of the net and rigging and any other desired pieces can have GPS monitors attached to allow progress to be tracked, to assist in operations in low visibility and to assist in positioning themselves next to a desired portion of the net 102. The GPS monitoring data could be transmitted to multiple locations, to allow monitoring of the operations from more than one location.

Figure 8:
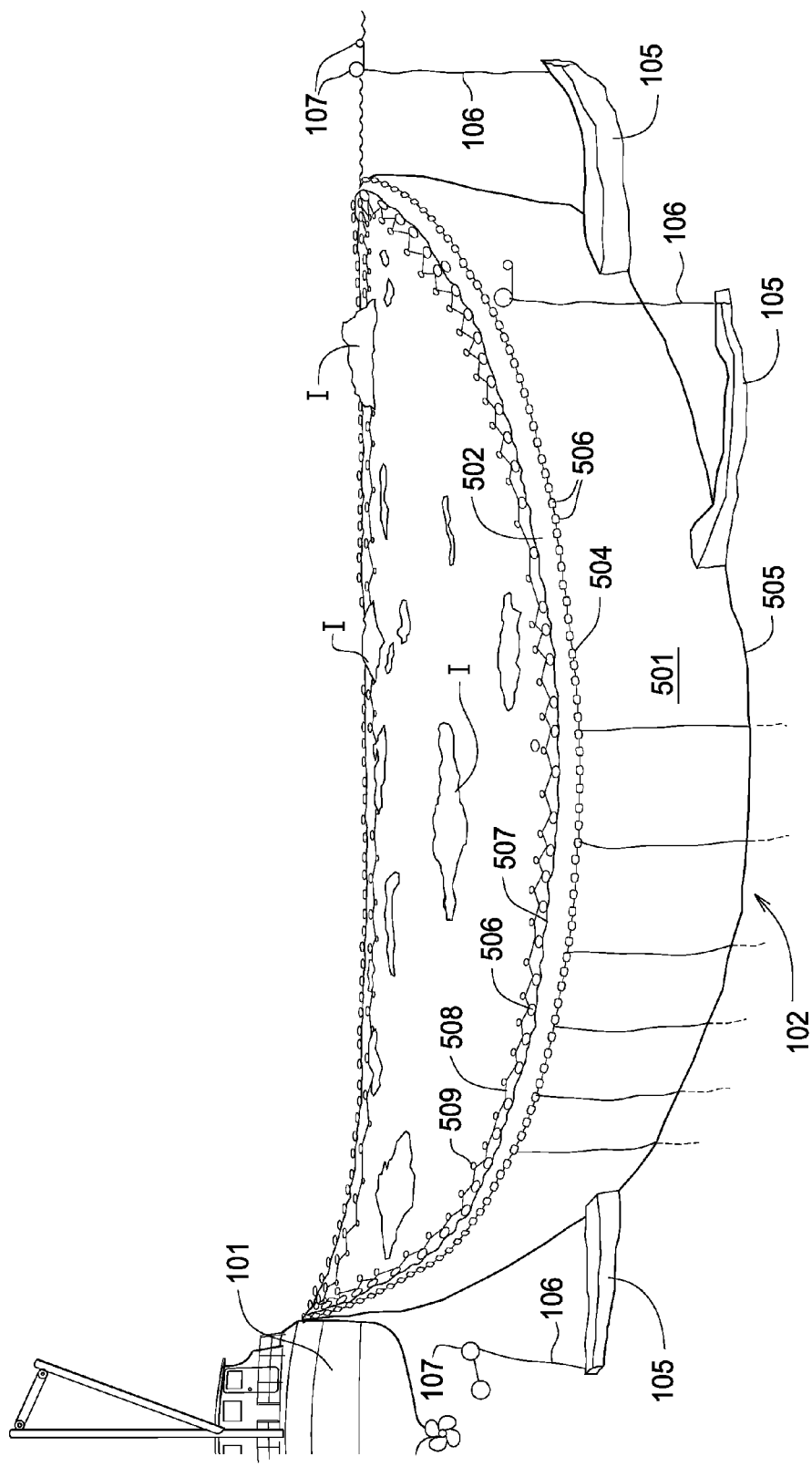
FIG. 8 is a perspective view of the net after it has been set, with the drains deployed and ice floating in the net.

Referring next to FIG. 8, a catcher vessel 101 encircles a portion of the oil spill with the net 102 including cakes of ice I. It is understood that more than one catcher vessel may be in use at one time. Each end 513, 514 of net 102 is attached to catcher vessel 101 upon encirclement. The weight of lead lines 505 and 511 pulls the net 102 vertical during the setting process. The encirclement is completed with the help of a small tug boat on "bunt" end of net 102. The net 102 is right-handed, which means the net is designed to always be set in a right-hand or starboard circle, and is drawn accordingly. A left-handed net could be used with an appropriately rigged vessel as well, depending on the configuration desired. In some cases it may be desirable to have one of each type of vessel on hand at a given spill to allow for different configurations of net. A number of assist vessels perform various functions during the procedure. The assist vessels are likely to be between 45' to 58 in length and will perform a multitude of tasks. The exact size and type of the assist vessels 104 will depend on the particular conditions of any given use. A number of different types of vessels may be used at any one time for the various functions described herein, depending on the tasks needed, weather conditions, water depth and other conditions. No limitation from any description of size, configuration or type of vessel should be implied.

Figure 9:
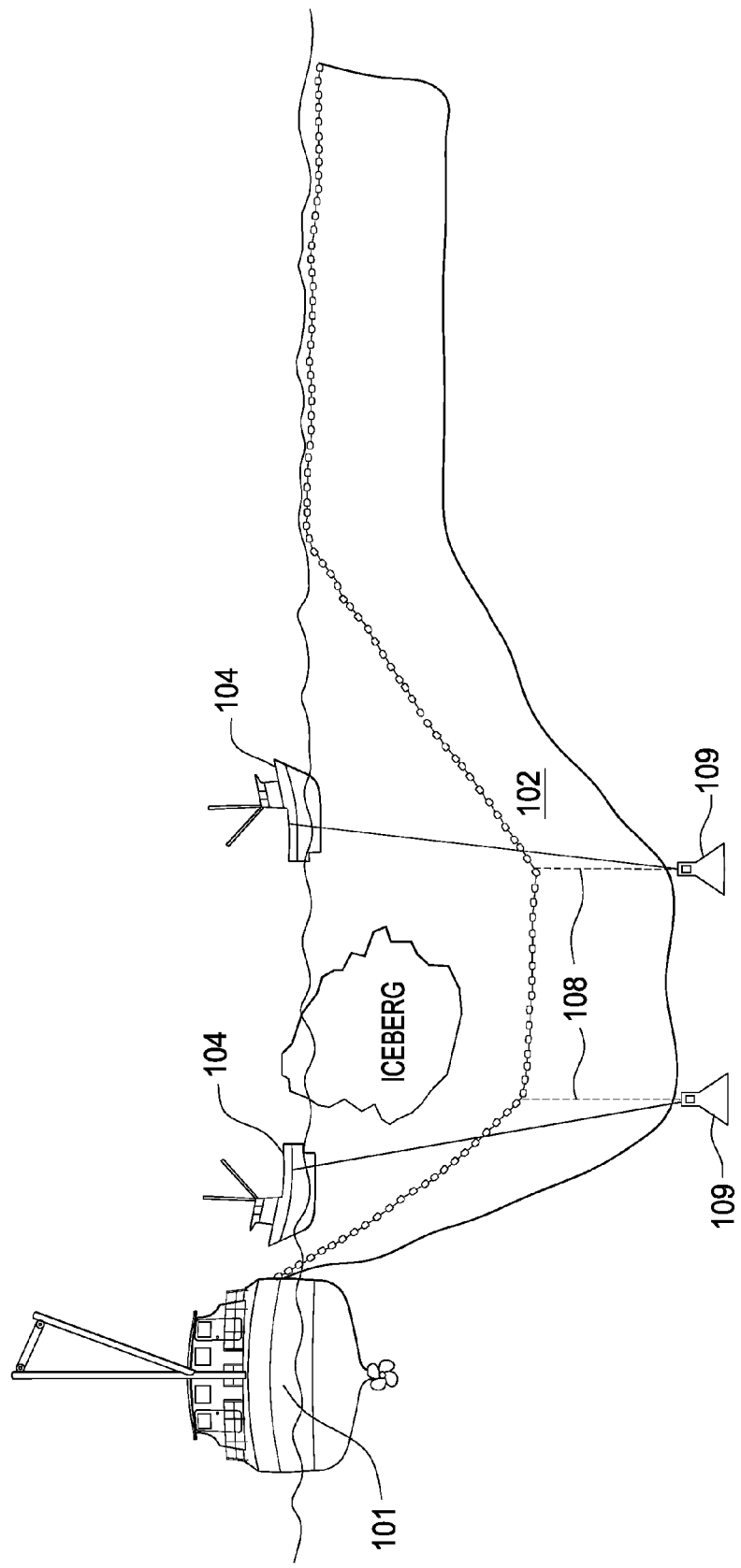
FIG. 9 is a perspective view of the net with the cork line lowered with large iceberg being towed free of the net area.

Once the circle is complete and the closing flaps are sealed if desired, some of assist vessels 104 can work the inside of the encircled area by attaching to the icebergs with small seines or other methods and towing them free of the work area as seen in FIG. 9. To tow the icebergs outside the encircled area, sink lines 108 with weights 109 are attached to the net 102 at the first cork line 504 and first lead line 505 to lower the top of the net below the surface to and allow ice to be towed by assist vessels 104 to outside of the net 102.

The location at which the net 102 should be lowered should be nearby to the catcher vessel 101 for two reasons. First, having a solid support (the vessel) near the dip helps to hold up the net 102, helps to keep the lowered area small, and second the prop wash from the assist vessels 104 towing icebergs I out of the net 102 pushes smaller oil contaminated ice and loose oil on the surface back into the bunt end of the net area. The use of a variable number of weighs, potentially of differing mass, allows the net 102 to be sunk to different depths and for different lengths on the surface as needed. The depth the net 102 will need to be sunk will depend on the size of the icebergs needing to be towed out of the net and the size of the vessels doing the towing. If needed, sonar technology could be used to determine the location of the bottom of the iceberg. It is often important to keep the sunken portion of the net 102 to a minimum, to reduce the amount of oil that escapes. Generally, only one iceberg at a time should be towed out of the net 102, to keep the sunken area small.

Figure 10:
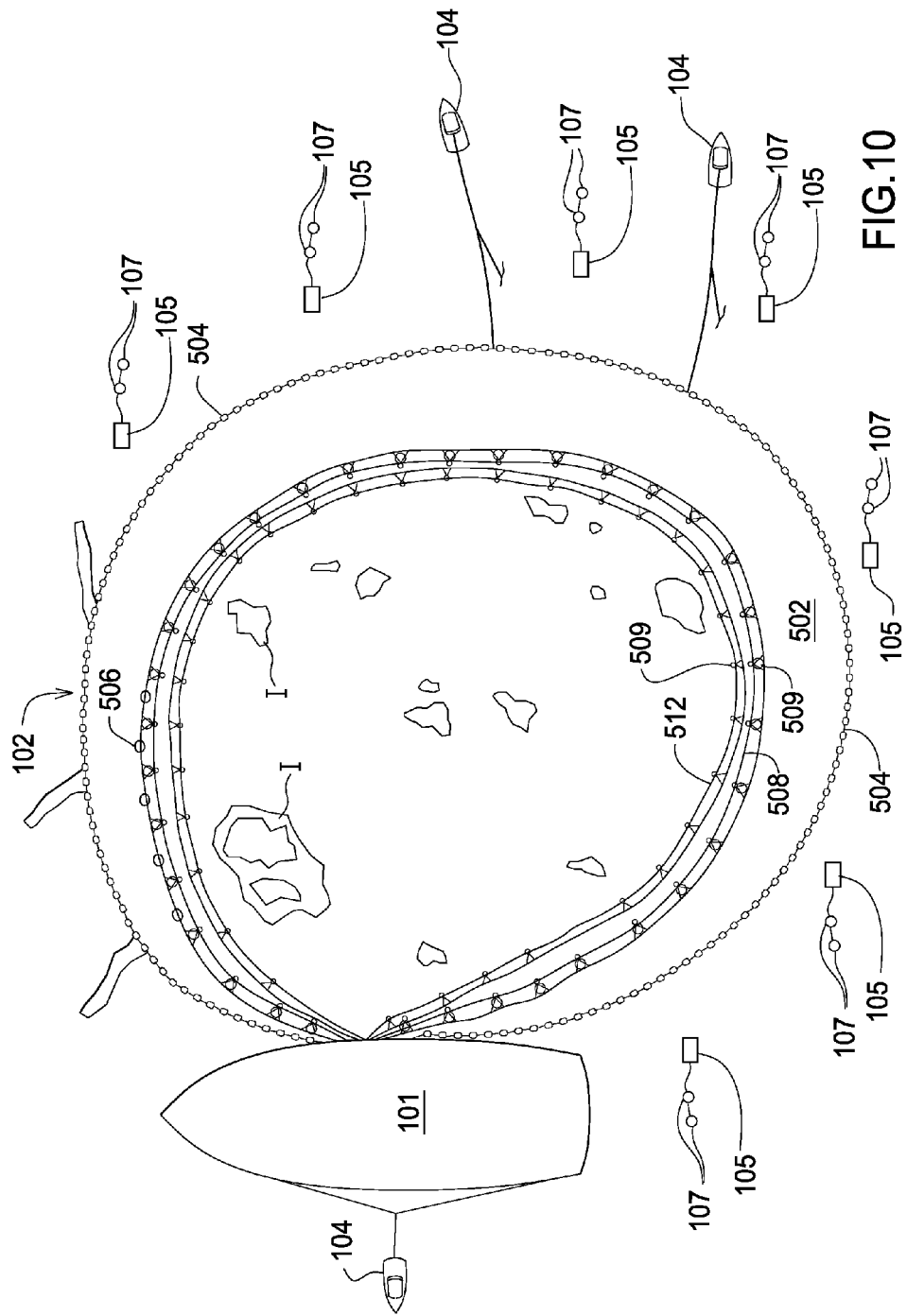
FIG. 10 is a top view of the area after the net has been set and pursing is starting.

The tug can hold the catcher vessel 101 in optimum position for wind, sea, current, ice flow or purse direction and/or attitude of net as seen in FIG. 10 if conditions warrant. At that point drains 105, which had been folded against the body 501 of the net 102, are deployed, as seen in FIG. 8. The drains 105 have lines 106 with buoys 107 attached the open end of the drains 105. The drains 105 can be located at or near the lead line 505 of body 501. The drains 105 allow the water trapped in the net 102 below the oil to escape the net 102 as the net 102 is pursed up. Since the oil floats on top of the water, this means that the water will slowly be forced out the drains 105. The lines 106 and buoys 107 can be used to adjust the height of the exit of the drain 105 in the water. As the net 102 is pursed as discussed below it is desirable to have the assist vessels 104 pull the exit of the drains up to near the surface of the water, so that the drains 105 can be monitored for oil escaping. This would indicate that the oil is at the depth of drain on the net 102, which in the depicted embodiment is the lead line 505 of the body 501. At this point the oil in the net 102 would need to be pumped out of the net 102 into waiting vessels, as discussed below.

Once ice has been cleared by the assist vessels 104, the net 102 is refloated by removing lead sinker weights 109. At the very beginning of a spill recovery with a large amount of oil in the water, speed of setting the net 102 may be more important that minimizing oil escape from a single set. In these cases, multiple vessels may be used in towing the ice 1 out of the area. Alternatively, assist vessels could be working on clearing a given area of water of ice while the first set in being drawn up as described below to allow a set of the net 102 to occur in an area that has already been cleared of large icebergs. If there are no icebergs too big to be pulled up in the net 102 in the area of any given set of the net 102, as described below, then this step would not need to be performed.

Large icebergs in the spill area are likely to have oil contaminated sides; therefore the icebergs should be contained in some way outside of the net 102. These contaminated icebergs can be tethered together by leaving seines attached and "pinched" off with connector lines. If there are enough of them, another catcher vessel 101 can set a net 102 around them for containment and control. These icebergs would need to be dealt with in some way in the cleaning process. Depending on weather conditions, it may be that if the icebergs are contained in a net 102 that is otherwise free of oil, the oil on the sides of icebergs would be washed off by wave action and melting, allowing the oil to be removed from the water.

To prepare for pursing the net 102, the assist vessels 104 are staged according to weather and water conditions for pursing and are attached to the net 102 with towing bridles 532 shown in FIG. 1B. The stationed assist vessels 104 aide in creating the shape of the net 102 and provide resistance necessary to break the small diameter lines that hold the cork line extension 502 and lead line extension 505 to the body 501 when one or both of the extensions needs to be deployed.

Once one or both extensions are deployed if desired, the pursing of the net 102 begins. The catcher vessel 101 has a net 102 around an encircled area free of large-to medium-sized icebergs with the extensions deployed and ready to begin the pursing portion of procedure, as shown in FIG. 10. The purse begins from high in the "standing gear" or "rigging" of the catcher vessel 101 and suspends the cork line purse line 508 above the ocean/oil and remaining ice brash. The ring lines 510 (shown in FIG. 12) allow the cork purse line 508 to be higher above the water without having to extend the height (and consequently weight) of the net 102. As the net moves closer to the vessel 101, the purse line 508 will be lowered accordingly and the ring line shortened accordingly. It is likely that only a well-seasoned purse seine captain will know how to correctly "purse" the net in accordance to wind, current, oil flow, etc.

FIG. 11A is a cutaway view of the net 102 after the extensions have been released from the deploying depth to an expanded depth and the purse lines are being drawn in. If one uses standard seine net rigging, the lead line purse line 512 would be pulling up on to boat 101 at an angle, as shown by dotted line 11-11. This would cause the water and ice in the net 102 to be pushed upward. To prevent this, tom tom weights 530 are lowered on lines 531 with the lead line purse line 512 fed through ring 532. There are two tom tom weights 530, one for bunt end 514, one weight for wing end 513 in the depicted embodiment. At the standard depth seen in FIG. 11a, the tom tom weights 530 are lowered until they are at the depth of the first lead line 505 so that the lead line extension 503 is basically horizontal as it is pulled through the water. The cork line purse line 508 is pulled from rigging up in the mast of catcher vessel 101 as is standard purse seine fishing. This creates a "cap" around the net 102 to help prevent oil from being washed over the net 102 by waves. This drawing does not accurately show the purse lines being drawn, as the purse lines would be being drawing from the ends of the 508 net next to the boat 101. However the drawing does reflect the tension on the purse lines 508 created by using the tom tom weights 530. In the depicted embodiment, the tom tom weights 530 are five-ton weights that are suspended from deck mounted winches with lead line pursing blocks attached. As would be clear to one skilled in the art, the line 531 would not stay vertical as drawn at all times. The weight of the net 102, currents and other factors would pull the line 531 off vertical. Care must be used to prevent fouling the rigging during seining.

The tom tom weights 530 allow the lead line purse line 512 to be pursed at variable depths. For example, if there is little ice in the water column, each weight 530 would be lowered to take a thin bite out of the water, reducing turnaround time for another set of the net. If an oil spill is mixed with mixed "brash" ice and hard-to-handle large ice chunks that draw a lot of water are moving toward critical habitat, the containment net 102 can be set out from shore and the catcher vessel 101 could purse off shore (which is usually is deeper) by lowering the tom toms 530. This gives the lead line extension 503 a better chance of pursing under the deeper icebergs. Once "pursed" up and condensed, the catcher vessel 101 with net 102 along side can be towed clear of critical area and commence the standard procedure. The tom tom weights 530 can also be used in areas with uneven bottoms. For example, if bunt end 514 is in deep clear water without snags etc., but the wing end 513 is going over reefs etc, the bunt end 514 could be pursed deeper than the wing end 513 using tom tom weights 520 set to different depths.

In FIG. 11B the tom toms have been lowered to allow lead line extension 503 to get under a large iceberg. If desired, the catcher vessel 101 can set the net 102 around big icebergs in a crooked net pattern. The assist vessels 104 can correct any zigzag that may have been set as needed. Another example would be a critical habitat lagoon that has a wide deep entrance on a flood or incoming tide, which would bring spilled oil and ice of every size and description into the lagoon. The net 102 (at over a mile long) could completely block the entrance to the lagoon. The catcher vessel 101 would hold the net 102 as long as possible (until there was too much ice) then "close-up" and purse big icebergs and all. The assist vessels monitor the exit tubes 105 and refasten exit tubes 105 to cork line 504 after the exit tubes 105 have been closed off (no oil or water leaking). At that point the catcher vessel 101 has pursed up the net 102. Cork line and lead line purse line rings are up and locked with the net hairpins secured to the boat to prevent them swinging away from the sides of the catcher vessel 102 as the net is towed away from the shore.

Figure 13:
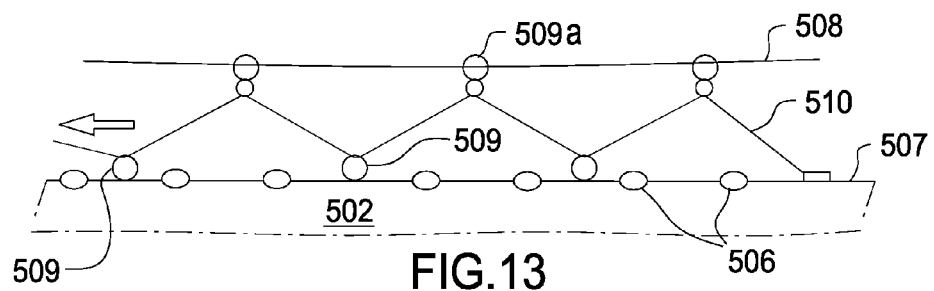
FIG. 13 is a schematic view of the ring line system with the rings straps fairly long.
Figure 14:
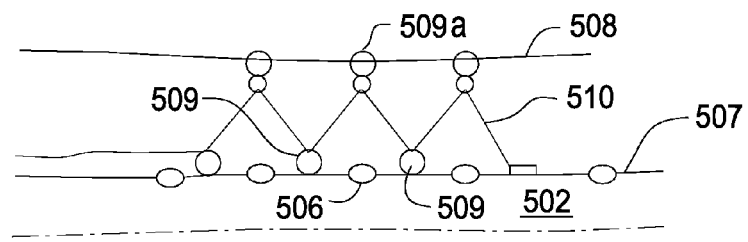
FIG. 14 is schematic view of the ring line system with the ring lines being drawn up.
Figure 15:
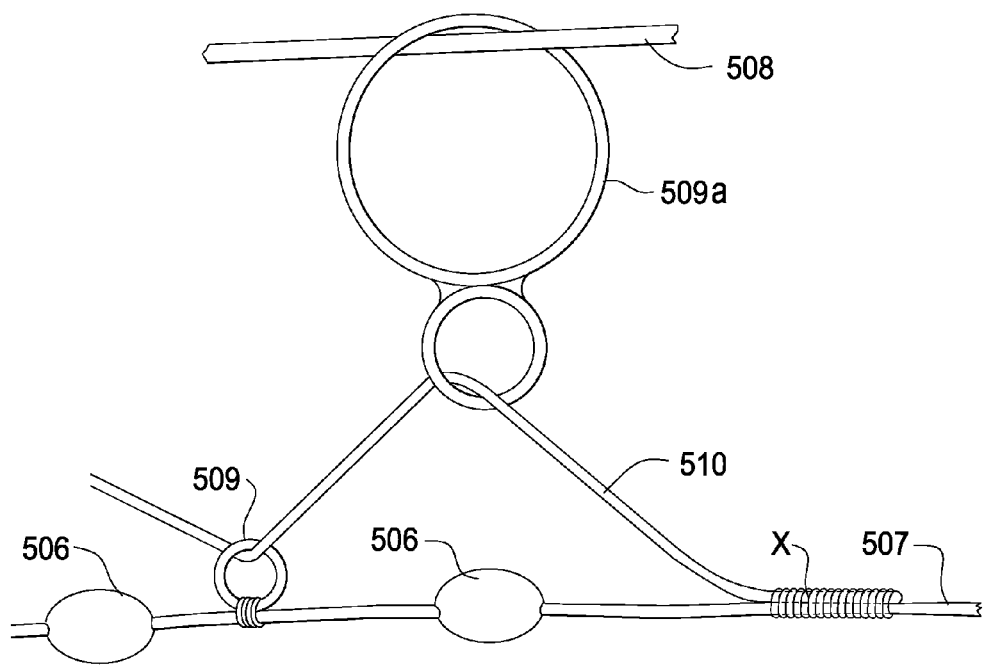
FIG. 15 is a close-up view of the end of the ring line attached to the cork line extension.

The catcher vessel 101 is in full pursing mode in FIG. 12. Cork line extension 502 is out and is being pursed to catcher vessel 101. The lead line extension 506 is out (underwater) and coming to catcher vessel 101. Adjustable ring line 510 allows pursing from high angle without extending net 102, as seen in FIGS. 13, 14, 15. The adjustable ring lines 510 are pulled in until even with other ring lines after pursing.

As seen in FIG. 13, the ring line 510 runs through rings 509 on the net 102 and double rings 509a. As the ring line 510 is pulled shorter, the purse line 508 is pulled closer to the net 102 and the rings 509 are pursed up, as seen in FIG. 14. The ring line 510 does not need to extend all the way around the net 102; it can be on each end for a chosen length. This length will depend on how high in the rigging the cork line purse line 508 is rigged and the sea conditions the net 102 is designed for. In FIG. 15, the ring line 510 is attached to the second cork line 507 at point X. Purse line 508 would then be strung through the next ring 509 on second cork line 507 (not shown). To get ring lines 510 shorter and even with rest of buoyed ring lines (which are most of the net), long ring lines 510 can be shorted by drawing in ring line 510, which attached to second cork line 501 at a point X. There would be two point Xs, one for each side of the net.

Figure 16:
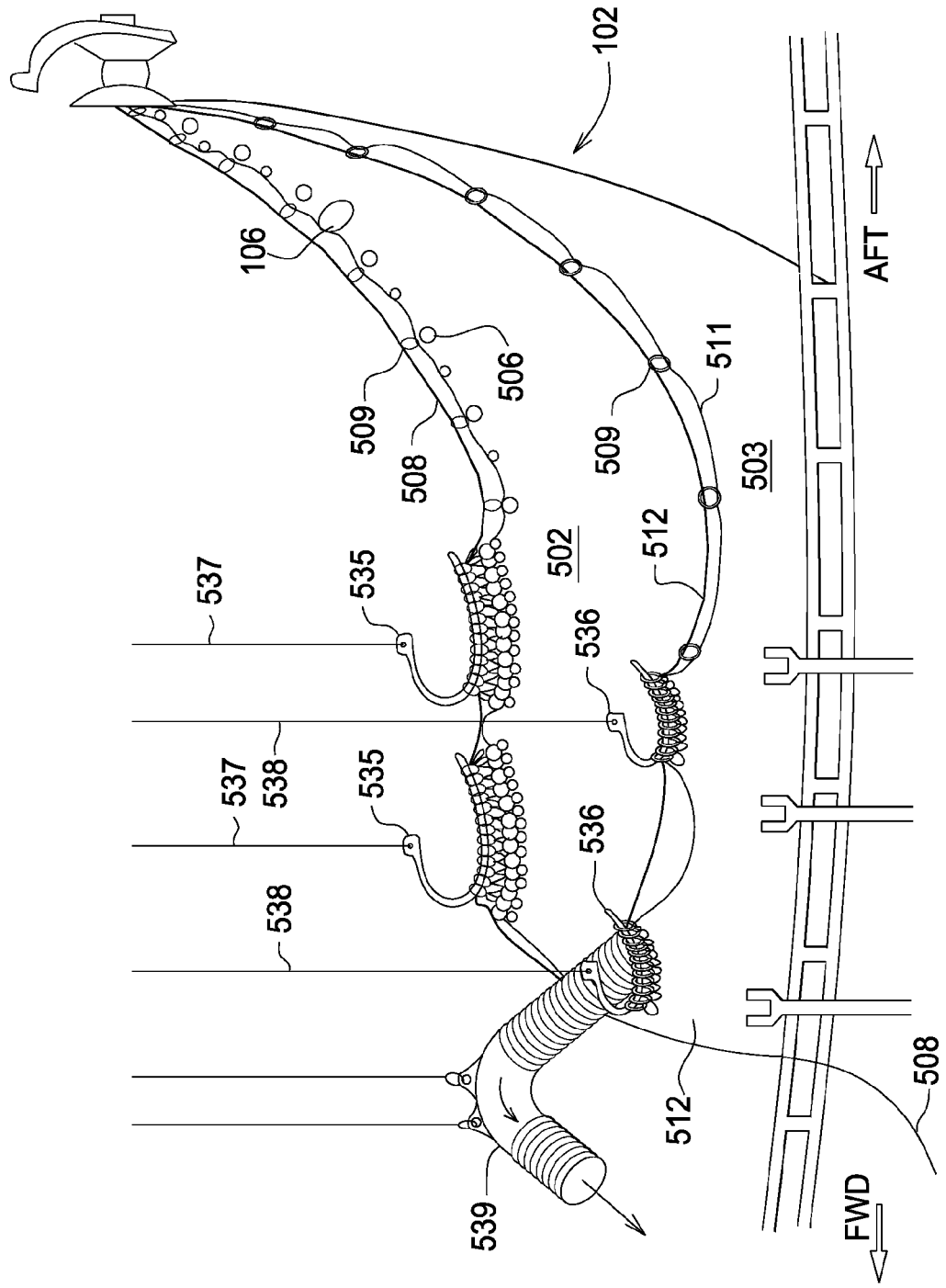
FIG. 16 is a perspective view of the net with the lead line and cork line being hooked on to hairpins to keep the net in place while the oil and oily slush is pumped out of the net.

As the top and bottom purse lines 508 and 512 are pursed, the purse rings 509 are threaded onto hairpins 535, 536, which are basically the same as the ones used in seine net fishing, as seen in FIG. 16. The rings 509 for the cork line extension 502 are threaded on tall hairpins 535 as the net 102 is pursed up as in standard seine fishing. The rings 509 for the lead line extension 503 are threaded on low hair pins 536. Vertical lines coming off each hairpin 537, 538 go to independent winches mounted on booms in the rigging of catcher vessel 101. The cork line hairpin winches (not shown) can be attached farther out on the booms to keep the cork line extension 502 away from the side of the catcher vessel 101, creating a holding bag. The ring lines 510 have been shortened on the second cork line 507 and made fast in FIG. 16.

Next, the breast line 515 is winched up and the rings 509 of bunt end breast line 515 are threaded on another hairpin (not shown). When complete, most or all of rings 509 will have been threaded on their respective hairpins and suspended from each boom winch. A tuna size seine block begins to take in the net 102, which is a large water/oil containing bowl that becomes smaller as the net 102 is taken on aboard the catcher vessel 101. As the bowl becomes smaller the oil remains on top and becomes a thicker layer as the exit tubes 105 allow the water to escape at the bottom of the net 102. When the net 102 is shrunk down to the point that oil is beginning to show in the exit tubes 105 (see FIGS. 8 and 10), the exit tubes 105 are closed and pursing is temporarily halted. The oil is then pumped out of the net 102 by suction pump tubes 539 that are lowered into the oil in the net 102. Pump tubes 539 can be provided with bars over the mouth to prevent large ice chunks from clogging pump tubes. If necessary, the tubes can be back flushed to clear the opening of ice chunks and other debris.

Oil and oily water along with oily slush are pumped into tanks in the catcher vessel 101, tanks on another vessel, or both. The catcher vessel 101 can also cross pump oil into another vessel, either directly out of the net 102 or out of catcher vessels 101 tanks once they are full. This allows catcher vessel to contain and pump more oil than its holding capacity and for more than one set of pumps to be in use at a time, increasing the speed of oil recovery. It is likely that the tanks the oil is pumped into will need oil/water separation systems, since it is likely that some water will be pumped up with the oil. Many such systems are known in the art, and any suitable one can be used in any given tank system. If necessary, in particularly bad spills, the assist vessels 104 could have pumps with long tubes to pump out of a very large set of the net that is already full of oil. As the oil is pumped from the net 102, the tuna purse block brings in the slack in the net 102 keeping the oil "condensed" in the bunt end of the net until as much oil and slush as can be is pumped out. Care will need to be taken not to pull up the net 102 too fast, spilling oil out of the net, or too slowly, allowing the oil to disperse back over the water, reducing pumping efficiency Once all the liquid that can be reached is pumped out, all that is left in the net 102 are oily ice chunks and other rubble that is too large to be pumped out of the net 102 and some small amount of liquid. This needs to be transferred out of the net 102. In small spills and/or if vessel 101 is a large vessel, the net 102 may be simply pulled on board with the rubble still in the net 102. The net 102 could be emptied into a containment area in the hold to be processed, similar to the fish in a standard fishing net. If desired, the rubble can be dealt with by another vessel leaving the catcher vessel 101 free to do another set of the net 102. This increases the speed at which the oil can be recovered from the sea.

A freighter 110 with a boom 111 can be used to process the oily ice and rubble. The freighter 110 has a rubble bag 112, seen in FIGS. 17 and 18.

Figure 18:
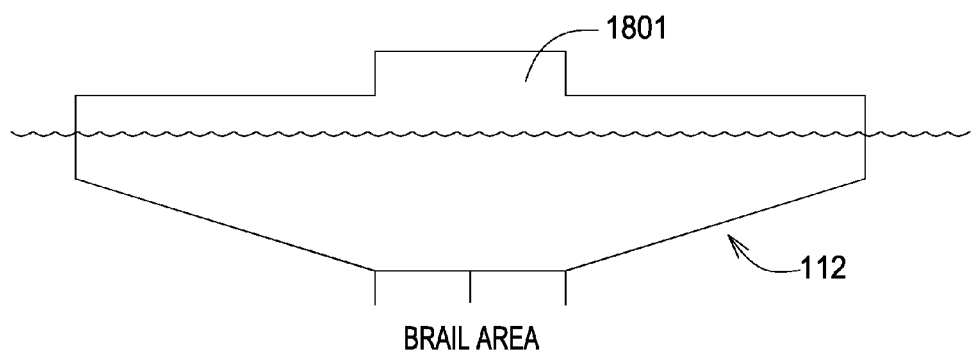
FIG. 18 is a side plan view of the rubble bag.
Figure 19:
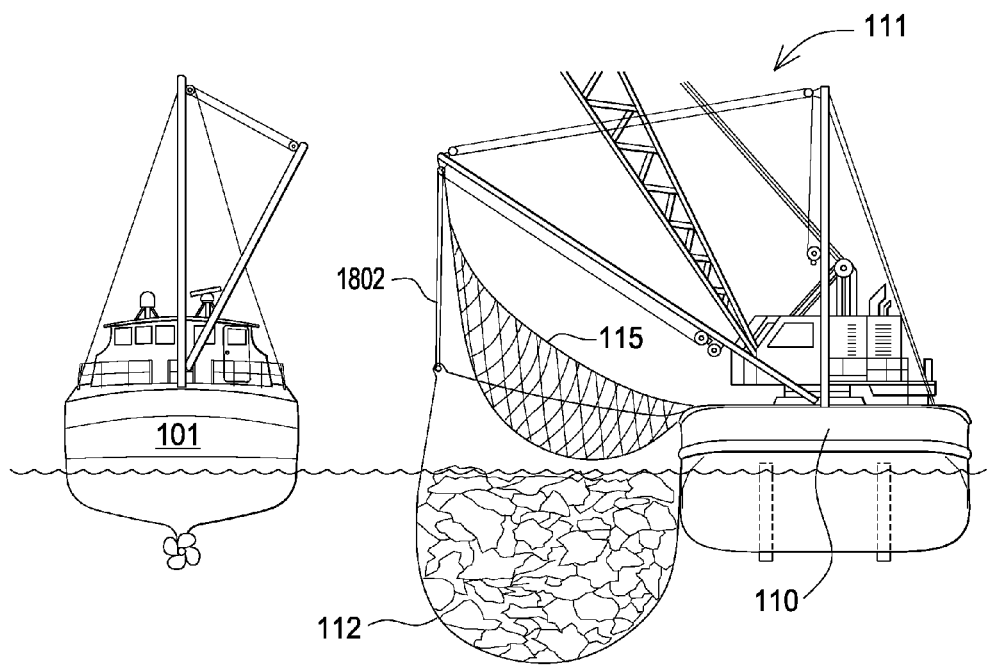
FIG. 19 is a side view of the oily rubble after being transferred to the rubble bag with the oily ice being brailed aboard the barge.

The shape of the rubble bag in the depicted embodiment can include an apron 1801, as seen in FIG. 18. This apron 1801 would be attached to the freighter 110 to help prevent any rubble or oil from spilling out of the bag 112 during the transfer of the rubble onto the freighter 112.

Figure 17:
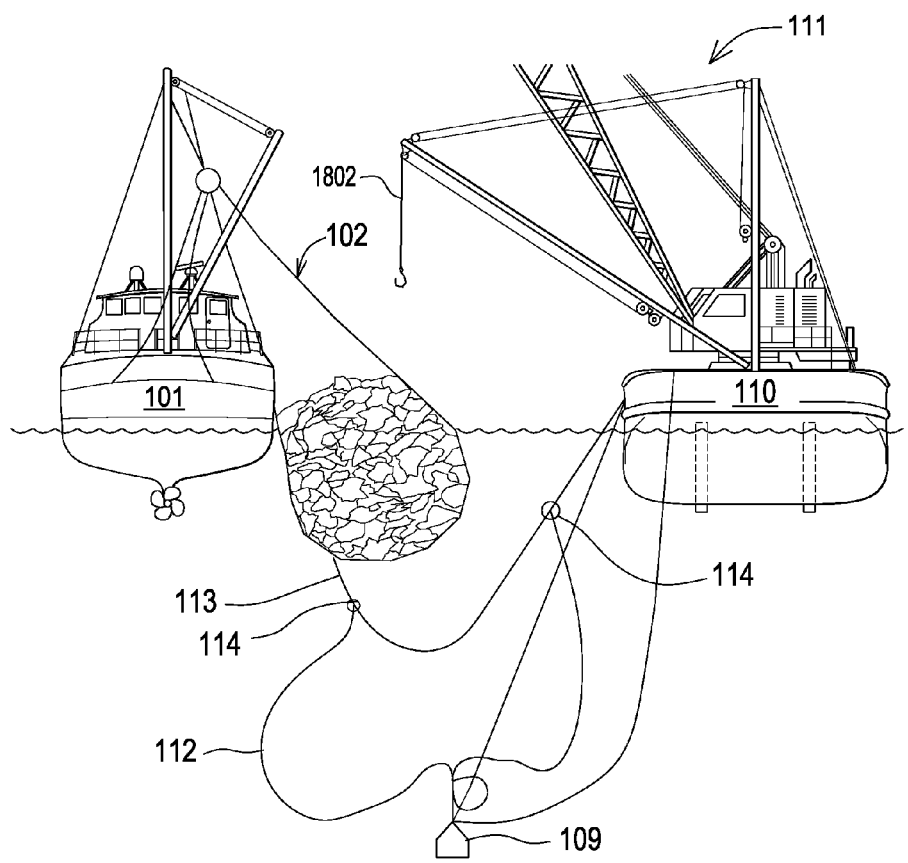
FIG. 17 is a side perspective view of the rubble bag as it is moved into position for the rubble in the net to be dumped in to the rubble bag.

The depicted embodiment is a barge. However, it is likely that a large vessel (600' or more in length) with multiple holding areas for rubble, oil and such would be used. To transfer the oily ice and rubble into the rubble bag 112, it is suspended between the catcher vessel 101 and the freighter 110, as seen in FIG. 17. The freighter crew first throws tag lines and winch lines 113 attached to bag 112 to the catcher vessel 101 crew. The catcher vessel 101 snaps the tag lines into pick points attached to the catcher vessel hull. The bag 112 is sunk under the net 102 and pulled up underneath it by winches on both ships. If needed, tom tom weights 109 can be attached to the bottom of bag 112 to sink the bag faster. The catcher vessel 101 would then winch bag up to the bulwarks. The bag 112 is then pumped and/or drained of water.

The bag 112 is under the net 102 and empty at this point. The catcher vessel 101 crew would then release the bunt end breast line 515 which opens net 102 and allows the oily rubble to fall into the rubble bag 112. The seine block would then pull the last of the net 102 back on board the catcher vessel 101 forcing out the last of any oily ice chunks caught in the net 102. This leaves the catcher vessel 101 with the net 102 on board, but still attached to the rubble bag 112.

Catcher vessel 101 crew would then locate the outboard boom lines 1802 from freighter 110. There are six boom lines 1802 in the depicted embodiment. The catcher vessel 101 crew attaches all the boom lines 1802 into rings 114 of rubble bag 112. The freighter 110 crew would then take up the slack in boom lines 1802 until all of the weight of the rubble bag 112 and contents is supported by the lines and booms of the freighter 110. The catcher vessel 101 crew then detaches itself from the rubble bag 112 and can then either be pulled away by assist vessel 104 or move away under its own power. The freighter 110 can also be pulled away by assist vessels 104 which hold the freighter in the best position according to sea conditions, wind current, etc.

Figure 20:
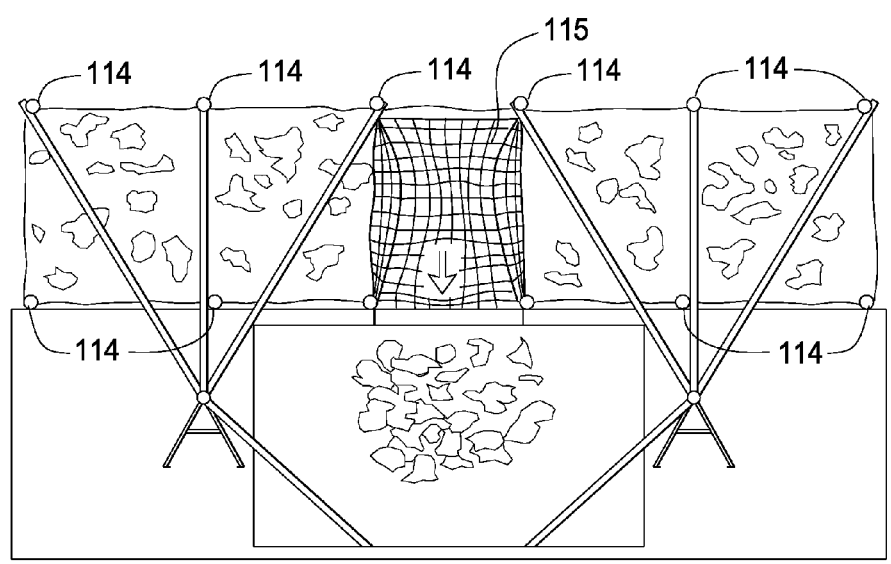
FIG. 20 is top plan view of the barge of FIG. 19.

A chain net 115 is used to brail the oily rubble out of the rubble bag into the hold of freighter 110, in the embodiment depicted in FIG. 20. While the depicted embodiment shows only a single brailing system, if desired, more than one brailing system can be in use simultaneously to speed up transfer of the oily rubble. Other means of transferring the rubble from the rubble bag into the hold of the vessel 110 could be used as well. The disclosure is not limited to a single means of transferring the rubble into the hold of the vessel 110. If the weight of the full rubble bag is low enough, the rubble bag may be able to simply be pulled onboard the vessel 110. The rubble bag could then simply be emptied into a holding tank.

Once on board the vessel 110, the oily rubble will need to be processed to remove the oil and separate the water from the oil. The ice can be melted with heaters, and then any of a number of oil and water separation systems can be used to separate the water from the oil. The water can be pumped back into the sea once it is clean, while the oil is kept in holding tanks. Any solid waste that is pulled on board could be processed as needed, depending on the nature of the material.

It is expected that the rigging and accompanying blocks will require surge gear where mast meets boom and booms meet block. These all need to give somewhat to absorb the shock of a large vessel rolling in a sea, hooked to many tons of water, oil and ice. In some weather condition, it may be necessary to spray the net and lines with a deicing solution to prevent them from icing over too much. The deicing solution would need to be chosen for it low environmental impact.

It is desirable that all of the vessels involved in handling the net and rubble have controlled drainage of their decks and work areas, to prevent oil from flowing off the net 102 and other rigging and back into the ocean.

Figure 21:
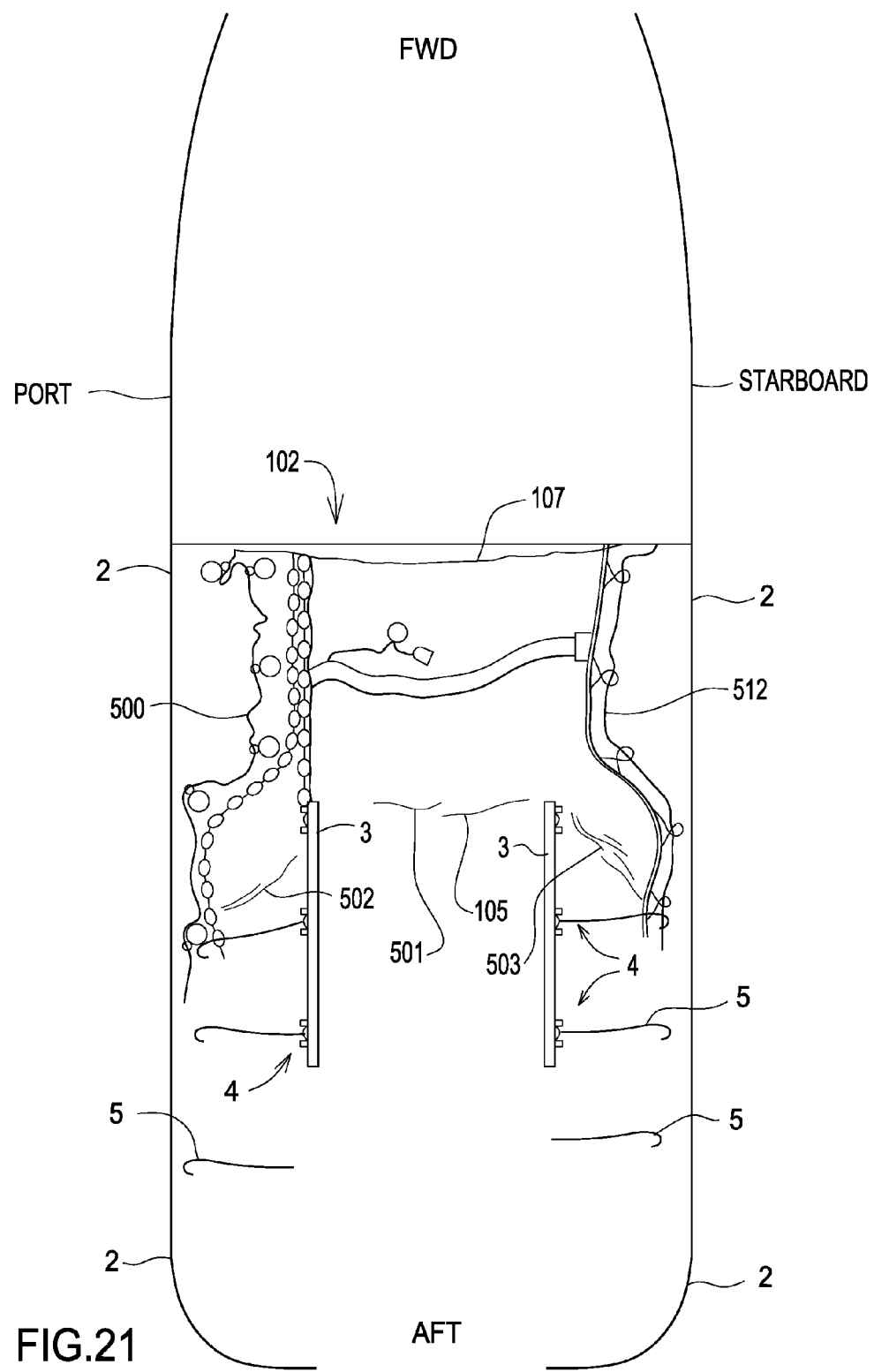
FIG. 21 is a top plan view of the deck of the catcher vessel.

The cork line extension 502 and lead line extension 503 on the body of the net 102 make the height of the net much larger than a standard net, which will mean that the net 102 has to be handled differently on the deck of the catcher vessel 101 as it is hauled in. The net 102 will have considerably more mass than a standard fishing net, and would be a significant hazard if it were to start sliding around on the deck. Care must be taken to ensure that the net 102 does not become fouled in any of the rigging on the vessel 101 and/or does not become a hazard to any of the crew. FIG. 21 is a top plan view of an embodiment of a deck of the catcher vessel 101 with the rigging not shown. The back section is a flat barge deck starting at bulkhead 1. The net 102 falls from the tuna seine bock on the deck. The body 501 is placed in the middle section 6 between two deck checkers 3. As the net 102 comes in, the crew stacks the body 501 of the net 102 into the center deck section 6 with cork line 504 and lead line 505 draped over the top of deck checkers 3 with the body 501 taking up all of the center section 6. In most deployments of the net 102, the cork line extension 502 and lead line extension 503 have been deployed. The extensions will be placed in side areas 7 and 8. The lead line is on the starboard side and the cork line is on the port side in the depicted embodiment. The exit tubes 105 run from the first lead line 505 to the first cork line 504, where it is tied up. The line and buoys rest on the body 501.

Figure 24:
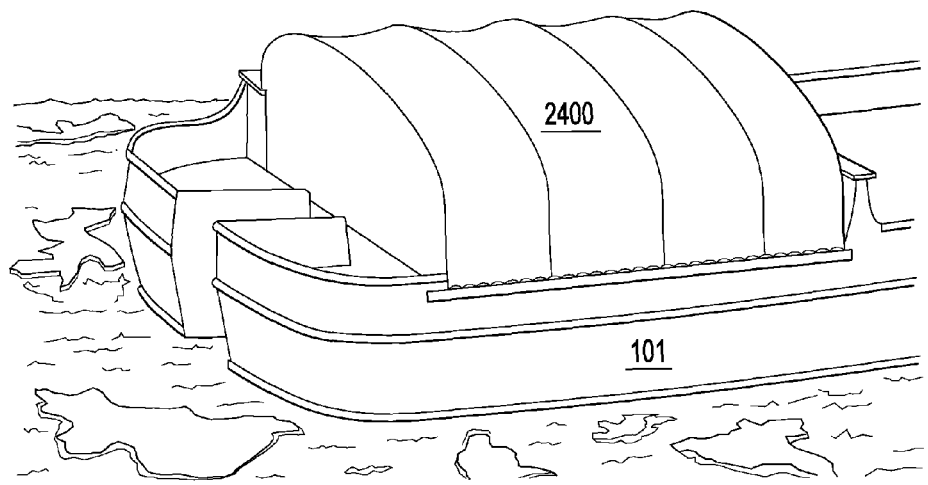
FIG. 24 is a side perspective view of one embodiment of a cover for the working area of the catcher vessel.

In the final stages of the cleanup of a given spill, it may be desirable to clean the oil off the net 102 before it is re-deployed. Many known solutions could be used for this purpose. Also, it may be desirable to have a de-icing solution sprayed on the net 102 as it is hauled on board to prevent the net and its rigging from freezing solid. If desired, the handling of the net 102 could be done on a lower deck and/or covered area to allow the area to be heated. One embodiment of a covered deck is shown in FIG. 24. This may add to the speed of the processing and/or the comfort and safety of the crew. It may also be desirable for the vessel 102 to have more than one net 102 on board, so that one net 102 could be deployed into the water while the other net 102 is cleaned and prepared to be re-deployed.

In order for the net 102 to be operated correctly again, the extensions 502, 503 must be re-tied into the deploying configuration. In the depicted embodiment there are winches 4 welded to the checkers 3 to assist in the re-folding of the extensions. Prior to hauling back the net 102 winch lines 5 are laid across the deck. After the extensions have been stacked over the top of winch lines 5, the winches 4 pull the extensions tight to the first cork line 504 and lead line 505. After the crew ties off the extensions, the winches are unhooked from the winch lines 5. Winches are likely to be recessed in actual use to reduce snagging, but are drawn not recessed for ease of viewing.

Figure 22:
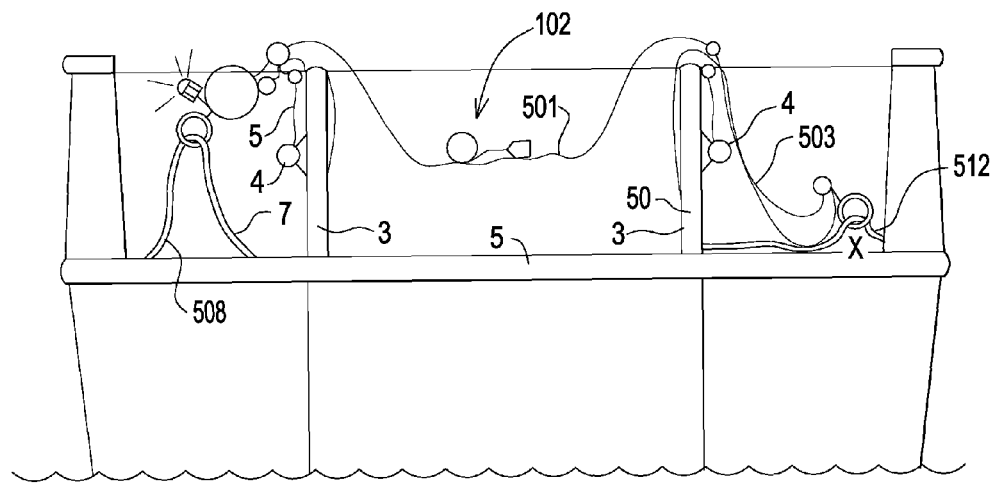
FIG. 22 is a side elevation view of the aft looking forward of the catcher vessel.

FIG. 22 is a back plan view from aft facing forward showing all three sections with the cork line pulled up and folded. The lead line extension 504 is in the process of being pulled up to the body lead line, then tied.

Figure 23:
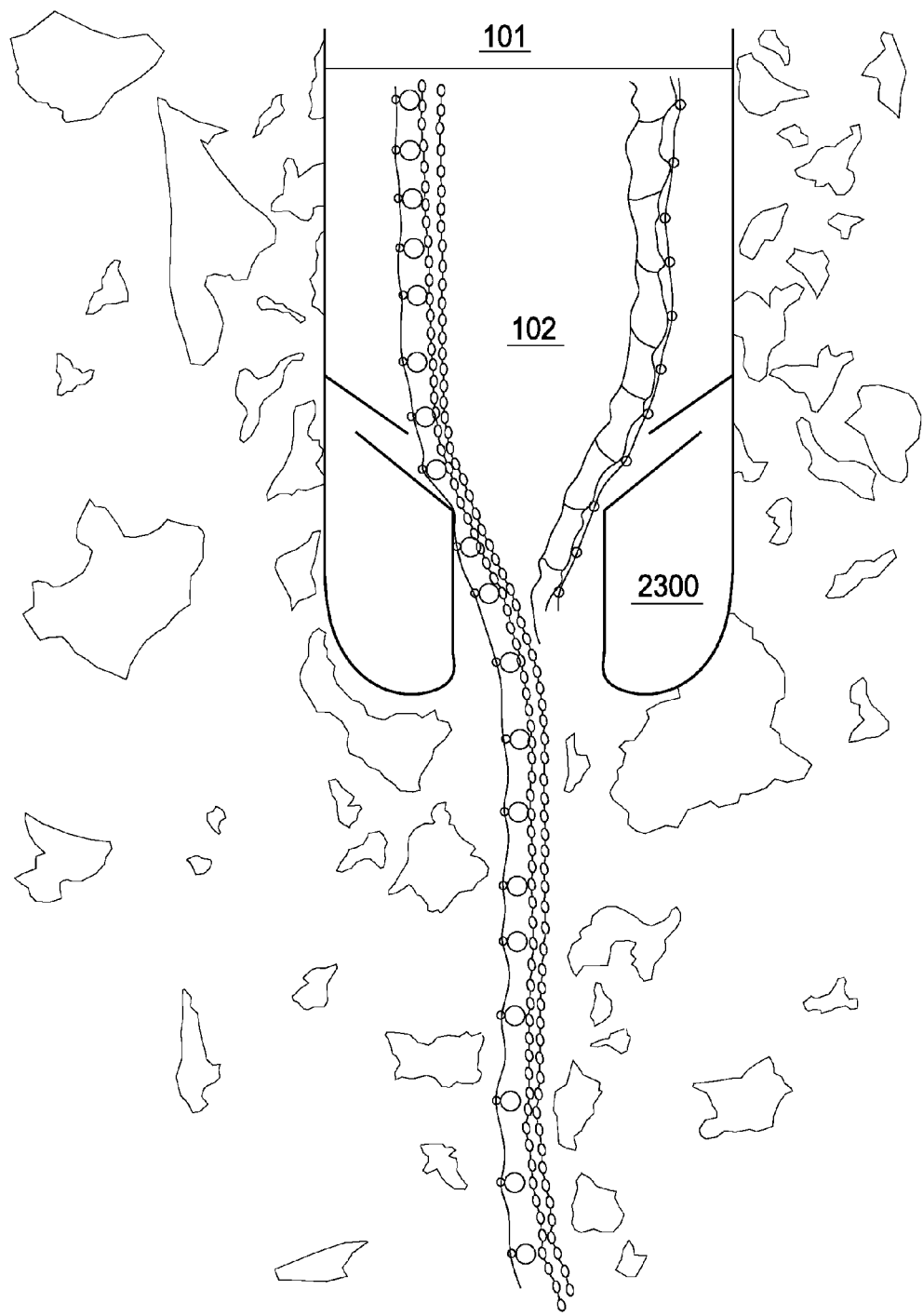
FIG. 23 is a top plan view of an alternate embodiment of the catcher vessel.

FIG. 23 is a top plan view of an alternate embodiment of the stern end of catcher vessel 101 setting the net 102. This stern designed in a way that allows the net 102 to be laid out without ice wrapping around the stern and fouling the net body and lead lines. With trawlers and whaling vessels the stern ramp is used to drag heavy loads up to the vessel's deck. Normal stern ramps are even or flush with the shape of the vessels stern. In ice recovery, catcher vessel 101 may need to have its stern ramp recessed to allow the net 102 to sink into water without ice getting in the way.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations within their true sprit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

I claim:

1. A method for containing and removing a contaminant spill in conditions of mixed ice and water, the method comprising:
    setting a contaminant and water resistant net using a main boat, the net having a length, a deployed depth and a means for monitoring oil depth around a portion of the oil spill;
    closing the net to enclose a first enclosed area of oil and water in the net;
    using rigging on the main boat to purse the net to reduce the size of the enclosed area;
    pursing the net until the contaminant has reached a chosen depth as detected by the means for monitoring oil depth in the enclosed area;
    pumping the contaminant out of the area into a container;
    repeat the steps of using rigging on the main boat, pursing the net and pumping the contaminant as needed until mostly contaminant and ice are in the net;
    drawing the net on board the main vessel as much as possible while reducing the size of the enclosed area;
    pumping contaminant out of the net while the net is being drawn on board; and removing any ice from the net that would prevent the net from being drawn on board.

2. The method of claim 1, further comprising the step of towing any large pieces of ice out of the first enclosed area.

3. The method of claim 1, wherein the ice in the net is removed by being dumped into a containment bag.

4. The method of claim 3, further comprising hauling the ice from the containment bag onto a second boat.

5. The method of claim 1, further comprising the step of releasing a folded portion of the net to increase the depth from the deployed depth to a first expanded depth.

6. The method of claim 4, further comprising the step of releasing a second folded portion of the net to increase the depth from the first expanded depth to a second expanded depth.

7. The method of claim 5, further comprising the steps of:
    lowering a weight on a line to a chosen depth, the line being attached to a pursing line on a bottom edge of the net;
    using the weight on the line to control the way the net purses to the boat.

8. The method of claim 1, wherein the means of monitoring the oil depth is a drain tube on the net.

9. The method of claim 1, further comprising monitoring elements of equipment being used using a monitoring means.

10. The method of claim 9, further comprising monitoring the location of elements of equipment being used using a monitoring means.

11. The method of claim 10, wherein the monitoring means is selected from the group consisting of GPS monitors, lights, radar reflectors, light reflectors or sonar.

12. A net for use in containing contaminant spills in water, the net comprising:
    a body having a top edge, a bottom edge, two ends, a length and a depth;
    a first cork line extending along the top edge of the body and a first lead line extending along the bottom edge of the body;
    a cork line extension attached along the body above the first cork line;
    a lead line extension attached along the body below the first lead line;
    the body, cork line extension and lead line extension being formed of an oil and water resistant material having sufficient strength to hold an amount of oil and ice in the net;
    a first purse line attached to the cork line extension;
    a second purse line attached to the lead line extension;
    a ring line attached to the cork line extension at a chosen location;
    the ring line being threaded through a first ring of a double ring;
    the first purse line being threaded through a second ring of the double ring;
    the ring line functioning to make the distance that the first purse line is from the cork line extension adjustable; and a drain tube attached along the bottom edge of the body functioning to allow fluid out of an area enclosed by the net.

13. The net of claim 12, further comprising a monitoring means attached to at least one location on the net.

14. The net of claim 12, further comprising a closing flap formed on at least one of the two ends functioning to allow the ends of the net to be closed together.

15. The net of claim 14, wherein the closing of the ends is water tight.

16. A net for use in containing contaminant spills in water, the net comprising:
- a body having a top edge, a bottom edge, two ends, a length and a depth;
- a first cork line extending along the top edge of the body and a first lead line extending along the bottom edge of the body;
- a cork line extension attached along the body above the first cork line;
- a lead line extension attached along the body below the first lead line;
- the body, cork line extension and lead line extension being formed of an oil and water resistant material having sufficient strength to hold an amount of oil and ice in the net;
- a first purse line attached to the cork line extension;
- a second purse line attached to the lead line extension;
- a monitoring means attached to at least one location on the net; and
- a drain tube attached along the bottom edge of the body functioning to allow fluid out of an area enclosed by the net.

17. The net of claim 16, further comprising a ring line attached to the cork line extension at a chosen location, the ring line being threaded through a first ring of a double ring, the first purse line being threaded through a second ring of the double ring; and
- the ring line functioning to make the distance that the first purse line is from the cork line extension adjustable.

* * * * *